United States Patent Office 3,773,867
Patented Nov. 20, 1973

3,773,867
NUCLEAR FUEL
Neville Ronald Williams, Leckhampstead, near Newbury, and Henry Lloyd, Wantage, England, assignors to United Kingdom Atomic Energy Authority, London, England
No Drawing. Filed July 24, 1970, Ser. No. 58,172
Claims priority, application Great Britain, Aug. 6, 1969, 39,481/69
Int. Cl. G21c 21/04
U.S. Cl. 264—.5    6 Claims

ABSTRACT OF THE DISCLOSURE

A method of forming a nuclear fuel body comprising a plurality of kernels of nuclear fuel material coated with fission product retaining material in a suitable matrix. The method comprises the steps of pressing the coated kernels which are overcoated with a layer of matrix material and a binder to form a compacted artefact whilst at the same time subjecting the kernels and matrix material to vibrations. The resulting compacted artefact is then cured and outgassed.

This invention relates to fuel for nuclear reactors.

In one form of nuclear fuel, kernels of fissile material are encapsulated in fission product retaining coatings (such as for example pyrolytic carbon and silicon carbide) and the coated particles are dispersed in a matrix of graphite. One method of obtaining a compacted body having the coated particles dispersed throughout its structure has been by applying a further outer coating comprised of the matrix material and a binder to each coated particle and subsequently compressing a number of coated particles having the matrix/binder overcoat in a die with a ram and heating the compacted body to cure the binder. In order to attain a structure of good integrity having a density of 2.62 grms./cc. with a matrix density in the order of 1.85 gms./cc. it is necessary to apply pressures of the order of 2,000 lb. f./square inch. In order to further increase the concentration of coated particles in the matrix it is necessary to increase the volume of coated particles in the total volume of the compacted body. This means that greater pressure has to be applied to the material being compacted. However the coatings of each coated particle are then subjected to greater forces and readily fracture, and the resulting fuel is unsuitable for use in a reactor system. The maximum quantity of coated particles that can be incorporated in the body is typically of the order of 25 to 30% by volume. If the volume of coated particles in the matrix exceeds 30% of the total volume of the body, when the load of 2,000 lb. f./sq. inch (to achieve the matrix density of 1.85 grms./cc.) is applied to compact the body, some of the fission product retaining coatings are susceptible to fracture. The lower the pressure to effect compaction and still attain a matrix density in the order of 1.85 grms./cc., the less likeliness there is of cracking the fission product retaining coatings of each coated particle.

Table I shows the typical results obtained when compacting different percentage volumes of coated particles in the same total body volume.

TABLE I

| Percent volume of coated particles | Pressure, lb. f./sq. inch | Number of particles cracked, percent |
|---|---|---|
| 25 | 2,000 | Nil |
| 45 | 2,000 | 10 |

According to the present invention a method of forming a nuclear fuel body comprises locating a plurality of kernels of nuclear fuel material each coated with fission product retaining material and overcoated with a matrix material in a die to form a loosely compacted artefact, compressing said artefact in the die whilst subjecting the said artefact to vibrations to produce a compacted artefact.

The binder may be cured whilst the compacted artefact is in the die and the binder subsequently removed.

The kernels of nuclear fuel may be fissile material or fertile material or a mixture of fissile and fertile materials.

The compacted artefact is preferably cured whilst in the die but may be removed from the die before curing. The binder may be thermosetting. A suitable thermosetting binder is a phenol-formaldehyde resin.

The compacted body may be heated to a first temperature to cure the binder to produce a cured artefact, to a second temperature in an inert atmosphere to carbonise the binder, and to a third temperature under vacuum conditions to cause outgassing of the cured artefact.

When the matrix material is graphite powder and the binder is a phenol formaldehyde resin the first temperature is preferably in the order of 70° C. to 200° C. The second temperature is preferably of the order of 850° C. and the third temperature is preferably of the order of 1850° C.

It was at first feared that the vibrations imparted to the nuclear fuel material as it was compressed would result in uneven distribution of the coated particles through the matrix. It was thought that the vibrations would shake the coated particles to the top and leave the fine powder of the matrix at the bottom of the die. This would result in an unsuitable nuclear fuel, and instead of avoiding damage to the coated particles, might well cause damage to them. However, contrary to these expectations it was found that the reverse was true; one achieved an even distribution of the particles and at the same time increased the percent volume of coated particles in the matrix whilst minimizing, or at least not increasing, the risk of fracturing the fission product retaining coatings of the fuel particles. It was also found that pressures of the order of 1,000 lb. f./sq. inch were required instead of 2,000 lb. f./sq. inch to achieve the same density as obtained in the past. The methods of the present invention offer significant advances over the previously known routes of making nuclear fuel bodies.

In one example of manufacturing ½ inch diameter pellets of compacted nuclear fuel, a matrix density of 1.85 grms. per cc. was obtained using pressures lower than 1,000 lb. f./sq. inch. The following steps were involved.

The coated particles comprising kernels of $U \cdot O_2$ encapsulated in pyrolytic carbon and silicon carbide were coated with a mixture of graphite powder and a phenol formaldehyde resin polymerised by hexamine. The coated particles having the outer coating of graphite and binder were placed in a die and were pressed at a temperature of 80° C. to 180° C. to effect particle bonding by means of a ram. At the same time the ram was oscillated at 20 kcs./sec. The compacted body was then heated to 850° C. in nitrogen to carbonise the binder and was subsequently heated to 850° C. in vacuum to outgas the body i.e. to remove oxygen and water therefrom. The carbonising may be carried out in argon or vacuum instead of nitrogen if desired.

Using the above technique Table II shows the loadings of coated particles in the matrix that were obtained.

TABLE II

| Percent volume of coated particles | Pressure, lb. f./sq. inch | Number of particles cracked |
|---|---|---|
| 24 | 750 | Nil per 10,000. |
| 51 | 1,000 | Do. |
| 55 | 1,000 | 4 per 10,000. |

It will be seen from Table II that the volume of coated particles may be almost doubled from that previously obtainable in the past by applying vibration to the material as it is being compacted.

In a second method of manufacturing nuclear fuel bodies the die was vibrated instead of the ram. It was found that good compaction resulted when a load of 1,500 lb. f./sq. inch was applied to the ram and the die was vibrated within the range of frequencies of 40 c./s. to 1 kcs./sec. using a Ling-Altec vibrator machine, Model V.1000 C.B. A body having a density of 2.73 g./cc. with a matrix density of 1.88 g./cc., was produced using this method.

Using this second method technique, Table III shows the loadings of coated particles in the matrix that were obtained.

TABLE III

| Volume of coated particles | Pressure, lb. f./sq. inch | Number of particles cracked | Frequency of vibrations, c./sec. |
|---|---|---|---|
| 40 | 1,500 | None out of 13,000 | 400 |
| 48 | 1,500 | Six out of 13,000 | 500 |

The density of the compacted body may be further increased by increasing the density of the graphite and binder outer coating which is applied to the coating particles before they are placed in the die. This may be achieved by spinning the coated particles which have an outer coating of the graphite and binder in a planetary mill so that the outer coating is compacted by the forces exerted on the coated particles as they are spun in the mill. The coated particles are then removed from the mill and poured into the die for compaction.

By comparing the results illustrated in Tables II and III with those of Table I it will be seen that the method of the present invention offers a significant advance over the previous routes of manufacture.

An additional advantage of the methods of the present invention is that uniformly dense bodies consisting of coated particles dispersed in a graphite matrix having an improved length to diameter ratio (length to diameter ratios greater than 10 to 1) can be made. This has been excessively difficult to achieve using the previously known routes of manufacture.

The fissile material may be mixed with fertile material, examples are Pu/U oxide or U/Th oxides and the matrix material need not be graphite and could be any suitable ceramic, aluminium oxide or a metal powder, for example nickel or stainless steel or aluminium oxide.

The loosely compacted artefact may be vibrated in the die by means of a probe which does not directly vibrate the die or the ram. It is envisaged that the use of such a probe could be applied to the manufacture of hollow cylindrical fuel pellets. In this instance the probe may form a core during the compaction and vibration stages of manufacture and subsequently be removed from the bore of the compacted fuel pellet.

We claim:
1. In a method of forming a nuclear fuel body wherein a plurality of kernels of nuclear fuel material each coated with fission product retaining material and overcoated with a binder dispersed therein are located in a die and compacted by a ram to produce a compacted artefact having a desired density and desired loading of coated fuel particles in the matrix said density and loading being such that the compacting step results in fracture of the fission product retaining coating of at least a small number of said particles; the improvement of obtaining a compacted artefact of said desired density and loading while substantially eliminating said fracture which comprises subjecting said kernels to vibration of at least 40 cycles per second during the compacting step, the pressure of compacting being substantially less than that necessary to obtain a compacted artefact of said desired density and desired loading in the absence of vibration during the compacting step.

2. A method of forming a nuclear fuel body according to claim 1 wherein the binder is cured whilst the compacted artefact is in the die and the binder is subsequently removed by carbonizing.

3. A method according to claim 1 wherein the binder is thermosetting.

4. A method according to claim 1 wherein the binder is a phenol-formaldehyde resin.

5. A method of forming a nuclear fuel body according to claim 1 wherein the compacted body is heated to a first temperature to cure the binder to produce a cured artefact, to a second temperature in an inert atmosphere to carbonise the binder, and to a third temperature under vacuum conditions to cause outgassing of the cured artefact.

6. A method according to claim 5 wherein the matrix material is graphite powder, the binder is a phenol formaldehyde resin, the first temperature is of the order of 70° C. to 200° C., the second temperature is of the order of 850° C. and the third temperature is of the order of 1850° C.

References Cited
UNITED STATES PATENTS

| 3,344,211 | 9/1967 | Redding et al. | 264—0.5 |
| 3,558,750 | 1/1971 | Davis et al. | 264—0.5 |
| 3,309,433 | 3/1967 | Roberts | 264—0.5 |
| 2,997,744 | 8/1961 | Stoddard et al. | 264—0.5 X |
| 3,173,973 | 3/1965 | Brockway | 264—0.5 X |
| 3,342,910 | 9/1967 | Ishihara et al. | 264—0.5 |
| 2,815,535 | 12/1957 | Bodine | 75—200 |
| 2,435,227 | 2/1948 | Lester | 75—214 |

FOREIGN PATENTS

| 1,185,940 | 3/1970 | Great Britain. |

CARL D. QUARFORTH, Primary Examiner
R. L. TATE, Assistant Examiner

U.S. Cl. X.R.
176—68; 252—301.1 R